US008619554B2

(12) United States Patent
Tune et al.

(10) Patent No.: US 8,619,554 B2
(45) Date of Patent: Dec. 31, 2013

(54) INTERCONNECTING INITIATOR DEVICES AND RECIPIENT DEVICES (75) Inventors: Andrew David Tune, Dronfield (GB); Robin Hotchkiss, Sheffield (GB)

(73) Assignee: ARM Limited, Cambridge (GB)

( * ) Notice: Subject to any disclaimer, the term of this patent is extended or adjusted under 35 U.S.C. 154(b) by 1556 days.

(21) Appl. No.: 11/498,985

(22) Filed: Aug. 4, 2006

(65) Prior Publication Data
US 2008/0086572 A1    Apr. 10, 2008

(51) Int. Cl.
*G01R 31/08* (2006.01)
*H04L 12/56* (2011.01)

(52) U.S. Cl.
CPC ..................... *H04L 45/28* (2013.01)
USPC ........ 370/228; 370/217; 370/227; 370/236.2; 370/352; 370/353; 370/354; 370/355; 370/356; 370/389; 370/392; 370/395.1; 370/395.31; 370/397; 370/400; 370/401; 370/409; 370/420; 370/463; 370/465; 370/469; 370/524; 709/239; 710/100; 710/105; 710/106; 710/116; 710/240; 710/241; 710/242; 710/243; 710/244; 710/305; 710/306; 710/311; 710/316; 710/317

(58) Field of Classification Search
None
See application file for complete search history.

(56) References Cited

U.S. PATENT DOCUMENTS

| 5,345,229 | A  | * | 9/1994  | Olnowich et al. | 370/360 |
| 5,519,694 | A  | * | 5/1996  | Brewer et al.   | 370/351 |
| 5,717,942 | A  | * | 2/1998  | Haupt et al.    | 712/13  |
| 7,002,908 | B1 | * | 2/2006  | Lund et al.     | 370/228 |
| 7,370,127 | B2 | * | 5/2008  | Avishai et al.  | 710/52  |
| 7,512,728 | B2 | * | 3/2009  | Tseng           | 710/100 |
| 2004/0251954 | A1 | * | 12/2004 | Mathewson et al. | 327/520 |

OTHER PUBLICATIONS

Dobinson et al., Topologies and routing in Gigabit switching fabrics, 2000.*

* cited by examiner

*Primary Examiner* — Faruk Hamza
*Assistant Examiner* — Aixa A Guadalupe-Cruz
(74) *Attorney, Agent, or Firm* — Nixon & Vanderhye P.C.

(57) ABSTRACT

An interconnect block for a data processing apparatus, said interconnect block being operable to provide data routes via which one or more initiator devices may access one or more recipient devices, said interconnect block comprising: a first and a second portion; said first portion comprising at least one initiator port for communicating with one of said initiator devices, and at least one recipient port for communicating with one of said recipient devices; said second portion comprising at least two recipient ports for communicating with at least two recipient devices, said second portion being connected to said first portion via at least two parallel connecting routes, said at least two recipient ports being connectable to said at least two parallel connecting routes; wherein in response to a request received from one of said initiator devices at said first portion to perform a transaction accessing one of said at least two recipients in communication with said second portion, said interconnect block is operable to provide a data route between said initiator device and said recipient device via said at least two parallel connecting routes and to maintain said data route for the duration of said transaction.

11 Claims, 7 Drawing Sheets

First transaction still blocked because arbitration on first channel in group cannot change until first transaction complete

Fig. 5d

Originating master removes transaction

INTERCONNECTING INITIATOR DEVICES AND RECIPIENT DEVICES

BACKGROUND OF THE INVENTION

1. Field of the Invention

This invention relates to the field of data processing systems. More particularly the invention relates to interconnect blocks for data processing apparatus, the interconnect blocks providing data routes via which one or more initiator devices such as a master may access one or more recipient devices such as a slave.

2. Description of the Prior Art

There are a number of different ways to interconnect devices on a data processing apparatus such as a system-on-chip (SoC).

These basically fall into two different systems, circuit-switched systems and packet switched systems. Each of these systems have their own advantages and disadvantages.

When the number of nodes (ie. masters and slaves) to be connected becomes large, fully connected circuit-switched interconnects such as ARM®'s PL300 tend to suffer from a large increase in area and a reduction in maximum clocking frequency.

Figure 1A:
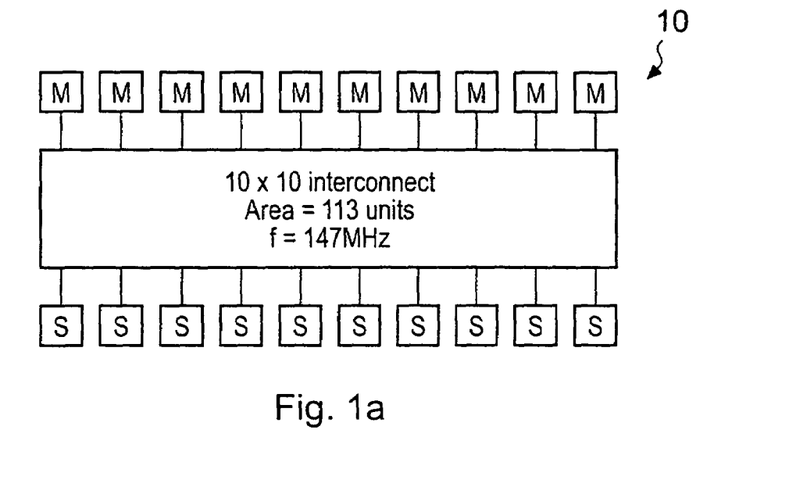
FIG. 1a schematically illustrates an interconnect block according to the prior art.
Figure 1B:
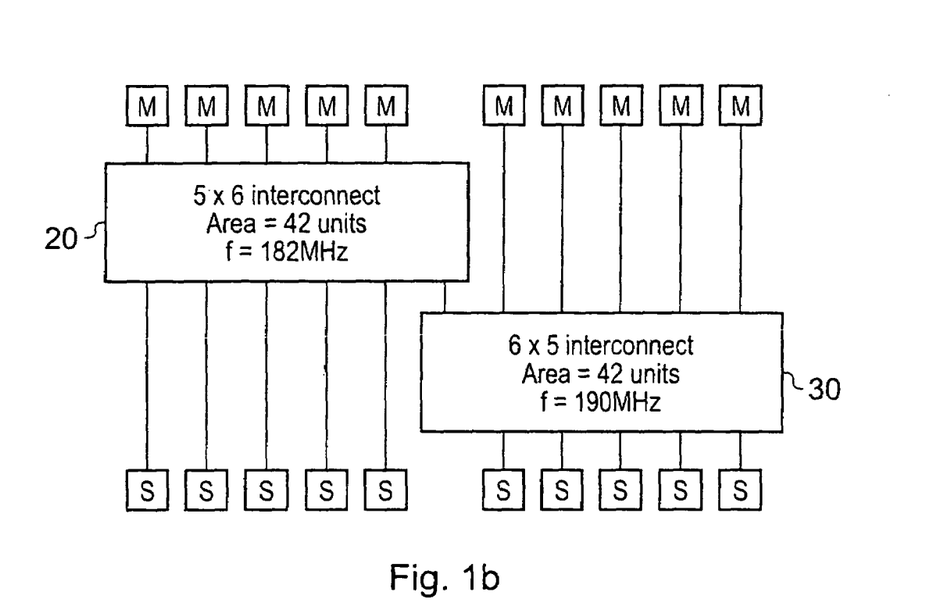
FIG. 1b schematically illustrates an interconnect block having hierarchical portions according to the prior art.

For these reasons hierarchical circuit switched interconnect structures are often used in SoCs. FIG. 1a shows a fully connected circuit switched interconnect 10 according to the prior art, while FIG. 1b shows one divided into two hierarchical portions 20, 30. The device of FIG. 1b provides an improvement in area over the device of FIG. 1a of 25% and an improvement in overall frequency of 24%.

The interconnect of FIG. 1b provides an improvement in area and operating frequency at a cost of reduced connectivity when compared to the interconnect of FIG. 1a. The reduced connectivity comes from the masters connected to portion 30 not being able to access the slaves connected to portion 20 in this embodiment. A further problem with the hierarchical circuit-switched interconnect structure of FIG. 1b is that traffic between portions 20 and 30 must share a common route and thus, if there is contention for this route performance of the interconnect as a whole is reduced. A case where this contention results in particularly poor performance is when a connection between a master and a slow slave is made across this connection. This blocks any other master connected to portion 20 from communicating with a slave connected to portion 30.

This problem can be particularly significant in a "blocking" protocol such as AMBA 3 AXI, that is a protocol in which a transfer, once initiated, cannot be removed until it completes.

In packet-switched systems, a packet of data can be sent independently of other packets of data from the same transaction and can thus, be sent down a route that is available at that time. This means that a particular route is only blocked for the length of time it takes to send the packet. This is advantageous when compared to circuit-switched systems where generally a whole transaction must be sent down one route and thus, this route is blocked until the transaction has completed, or in some systems has been removed.

Grouped adaptive routing is a technique that is used in packet switched networks and which is described by Reinemo et al. in "Topologies and Routing in Gigabit Switching Fabrics" a scientific thesis from The University of Oslo 2000. It is described as a technique that enables a packet to take one of several paths through a network depending on the local states of contention, by allowing the packet to be sent down any link in the group which is not currently in use. It has been used in star topologies using worm-hole packet-switched routers.

SGS-Thomson Microelectronics "STC104 asynchronous packet switch" engineering data 1996 discloses a switch that implements grouped adaptive routine so that consecutive output links are grouped to allow packets routed to the first link of the group to be sent down any free link in the group depending on which is the first link to become available.

However, despite the advantages of not blocking a route circuit-switched networks are currently preferred over packet switched systems for System-on-Chip interconnects, see for example "NOC, NOC, NOCing on heaven's door beyond MPSCOS", report on $7^{th}$ Annual Symposium on System-on-Chip", EDN Dec. 8, 2005. This is because they can be simple, low-latency, low-power and low-area compared to packet-switched architectures. This is in part because they do not require network buffers or complex switches.

Embodiments of the present invention seek to improve the performance of hierarchical circuit switched interconnects without overly increasing chip resources.

SUMMARY OF THE INVENTION

A first aspect of the present invention provides an interconnect block for a data processing apparatus, said interconnect block being operable to provide data routes via which one or more initiator devices may access one or more recipient devices, said interconnect block comprising: a first and a second portion; said first portion comprising at least one initiator port for communicating with one of said initiator devices, and at least one recipient port for communicating with one of said recipient devices; said second portion comprising at least two recipient ports for communicating with at least two recipient devices, said second portion being connected to said first portion via at least two parallel connecting routes; wherein in response to a request received from one of said initiator devices at said first portion to perform a transaction accessing one of said at least two recipients in communication with said second portion, said interconnect block is operable to provide a data route between said initiator device and said recipient device via either one of said at least two parallel connecting routes and to maintain said data route for the duration of said transaction.

The present invention recognises both the advantages of and the problems associated with hierarchical circuit-switched systems and it addresses these by providing an interconnect block that is divided into portions to save area, but provides at least two alternative data routes between the portions such that a transaction requiring a master connected to the first portion of the interconnect to access a slave connected to the second portion can select any available one of the plural data routes. This connection between the master and slave is then maintained for the transaction effectively blocking other transactions from using the data route between the portions that it has selected. However, even if it is a transaction that takes some time, there is at least one other alternative route between the two portions available for other transactions to use. This significantly reduces the chances of a slow transaction blocking other transactions and causes a surprising increase in performance.

Thus, an interconnect having the advantages of simplicity, low latency, low area and low power associated with circuit-switched architecture is produced, but which avoids or at least reduces the increased latency and reduced bandwidth of such systems. It is particularly suited for some blocking protocols and provides a workable solution for interconnects in SoC systems.

It should be noted that a transaction generally involves a data transfer and is generally initiated by the sending of an address, this address determines the destination and in response to it a suitable route is opened. This route is maintained until the transaction is finished, that is the data transfer associated with the address has completed or an acknowledgement is received from the slave.

In some embodiments, said interconnect block is operable to provide said data route via one of said at least two parallel connecting routes, said one of said at least two parallel connecting routes being selected in dependence upon a predetermined criterion.

The arrangement provides at least two parallel connecting routes, which allows one of the parallel connecting routes to be selected to form a data route between initiator devices on one portion and recipient devices on the other. The selection of the particular connecting route can be done according to a number of predetermined criteria depending on the embodiment and the desired properties of the interconnect block.

In some embodiments, said at least two parallel connecting routes are equivalent to each other.

Although in some embodiments some of the at least two parallel connecting routes are different to each other, in other embodiments they are equivalent. Having equivalent connecting routes, means that either can be selected for a particular transaction and it will make no difference which one is selected.

In some embodiments said interconnect block is operable to provide said data route via at least two of said at least two parallel connecting routes, one part of said transaction travelling along one of said connecting routes and a further part of said transaction travelling along a different one of said connecting routes.

If two of the at least two connecting routes are equivalent to each other it does not matter which is selected and in some embodiments both of the two equivalent parallel connecting routes can be selected and the transaction can be split into part one part going down one of the routes and another part of the transaction going down a different one of the routes. Although this is described with respect to a single transaction it should be clear to the skilled person that multiple transactions could correspondingly each be sent down plural routes. However, it is generally preferred for a transaction to go down a single route as this avoids the need for the slaves to have any special properties or the need for special reordering buffers to deal with any of the transaction parts that get out of order.

In some embodiments, said first portion comprises at least two connecting routers associated with said respective at least two parallel connecting routes, and at least one initiator port router associated with said initiator port, said initiator port router operable to provide data routes from said initiator port router to said at least one recipient in response to an address associated with said request indicating said at least one recipient or to said at least two connecting routers in response to an address associated with said request indicating one of said at least two recipients communicating with said second portion.

The first portion can be arranged such that the connecting routes connecting the first portion to the second portion have routers associated with them on the first portion, these routers are used to control which connecting route is selected for a particular transaction. In response to a transaction having an address associated with it that indicates a recipient on the second portion the initiator port router initially opens data routes to all connecting routes between the portions. The routers associated with these connecting routes can then arbitrate between these routes and select one of the connecting paths. Initially opening all routes and then arbitrating between them is found to be an efficient way of reducing potential delays that might occur were the routes opened individually one after the other.

In some embodiments, said interconnect block further comprising at least two connecting routers associated with said respective at least two parallel connecting routes and an arbiter, said arbiter operable to control said at least two connecting routers to select one of said at least two connecting routes for a particular transaction in response to a predetermined criterion.

The use of routers associated with the parallel connecting routes which are controlled by an arbiter allows the selection of the route to be performed efficiently.

In some embodiments, said arbiter is operable to control said at least two connecting routers, such that said data routes from said initiator port router to said at least two connecting routers associated with said parallel connecting route not selected are closed and a data route to said connecting router associate with said selected connecting route is maintained.

Opening all routes to the connecting paths and then selecting one and closing the others has been found to be an efficient way of providing the connection. It should be noted that in many embodiments the two or more connecting routes are equivalent and thus it makes no difference which route the connection between the initiator and recipient takes. Furthermore, the provision of these routers and a controlling arbiter which arbitrates between the paths avoids the need for further combinatorial elements to be added to the connecting path. Given that all routes to the interconnects are initially selected, the linking of the connecting routers via this arbiter enables the routers to know when one has been selected and the others can then act to close their routes.

In some embodiments, said predetermined criterion comprises an availability of said connecting routes.

Clearly if one route is not available then the connection should be made via the other route.

In some embodiments, said second portion further comprises at least one initiator port for communicating with at least one further initiator device, said second port-ion being operable to provide a data route between said at least one initiator port and said at least two recipient ports, such that said at least one further initiator device may access either of said at least two recipient devices.

The second portion can also have one or more initiators connected to it. These can communicate with the recipients on the second portion. It should be noted that some of the recipients on the second portion may only connect with initiators on their portion and may not connect with the connecting routes. This is because it may be that some recipients will only ever talk to some initiators and these initiators and recipients are both connected to the second portion and as such there is no point in providing further connections that will never be needed.

In some embodiments, said second portion further comprises a further recipient port and said first portion further comprises a further initiator port, said further recipient port and said further initiator port being connected to each other such that said interconnect block can provide a data route between said further initiator device in communication with said second portion and said at least one recipient device in communication with said first portion.

Providing a further recipient port on the second portion that is connected to a further initiator port on the first portion allows a data route to be provided between initiators on the second portion and recipients on the first portion. In other embodiments without this route such connectivity may not be possible. This increased connectivity can be advantageous in some embodiments, whereas in others where these initiators and recipients will never want to be connected such an arrangement is not desirable.

In some embodiments, said first portion comprises at least two initiator ports operable to communicate with at least two initiator devices and wherein said first portion is operable in response to two requests to access two of said at least two recipients received in a same clock cycle from two of said initiator devices, to provide two data routes between said initiator devices and said recipient devices via two of said at least two parallel connecting routes.

Embodiments of the present invention can receive transaction requests from multiple initiators in the same clock cycle and can process them in parallel. This is clearly advantageous from the bandwidth point of view.

Although, embodiments can provide interconnect blocks which comprise many different numbers of parallel connecting routes, interconnect blocks having two parallel connecting routes have been found to be particularly advantageous as two parallel connecting routes do not provide a great increase in area but do provide a significant increase in performance.

A further aspect of the present invention provides a method of configuring an interconnect block for a data processing apparatus, said interconnect block providing a plurality of data routes between any one of a plurality of initiators and any one of a plurality of recipients, said interconnect block comprising at least a first portion and a second portion, said first portion being operable to communicate with at least one initiator device and at least one recipient device, and said second portion being operable to communicate with at least two recipient devices, said method comprising the steps of: (i) requesting a user to input at least one of the following: number of initiator devices and number of recipient devices; behavioural models for said recipient and initiator devices; and details of required connectivity between said recipient and initiator devices; (ii) assigning a number of data routes between said portions of said interconnect block; (iii) calculating a configuration of said interconnect block and (iv) outputting a description of said configured interconnect block.

A method of configuring an interconnect block can be provided which can calculate the configuration of the interconnect block based on characteristics input by a user via a GUI in step (i). This can then be output in an appropriate form such as a verilog, VHDL, system C models and this can be used in the design of the interconnect.

In some embodiments step (ii) comprises requesting a user to assign a number of data routes between said portions of said interconnect blocks.

In some embodiments the user selects the number of routes between portions of the interconnect blocks and the interconnect block is configured to this requirement, while in other embodiments this is done automatically.

In some embodiments step (iii) comprises the following steps: (a) calculating properties of an interconnect block configured with said assigned number of data routes between said portions; (b) assessing if said properties are acceptable; (c) deciding if said properties are acceptable and if not returning to step (ii) and assigning a different number of data routes between said portions.

A method of configuring an interconnect block can be provided which can simulate the performance of a hypothetical interconnect block based on known characteristics and properties and can amend the number of connecting routes provided between the portions to calculate a suitable configuration for the interconnect block. This can then be output in an appropriate form such as a verilog, VHDL, system C models and this can be used in the design of the interconnect.

In some embodiments said step (a) comprises using a simulation model of said interconnect block to calculate said properties.

A simulation model of an interconnect block having certain characteristics is an effective way of calculating its properties without actually building it.

In some embodiments said step (i) further comprises requesting a user to input desired properties of said interconnect block and said step (c) comprises comparing said calculated properties with said desired properties.

The interconnect block can be configured to have particular desired properties, its properties being calculated for certain configurations, until a particular configuration produces the desired properties.

In some embodiments said method comprises a further step (iii') performed before step (a) of assigning initiator devices and recipient devices to said first and second portions, performing step (a) to calculate properties and repeating step (iii') and step (a) a number of times and selecting the arrangement with the preferred properties and then proceeding to step (iii).

The configuration of the interconnect can be further changed by amending the arrangement of the initiators and recipients. The model can then be used to assess which arrangement produces the desired properties.

A yet further aspect provides a computer-readable program product comprising a computer program for controlling a computer to perform the steps of a method according to a further aspect of the present invention.

DESCRIPTION OF THE PREFERRED EMBODIMENTS

It should be noted that in the following embodiments, connections are described as being between masters and slaves. It should be clear to the skilled person that a master, could in more general terms be referred to as an initiator and a slave as a recipient.

The initiator devices can be many different things including processors, DMA controllers or LCD controllers, while recipient devices may be interfaces to external buses, protocol conversion, USB interface, memory, audio/video interfaces, or a keypad. The interconnect device may also take several forms including a bus.

Furthermore, when transactions are described, it should be noted that these can vary depending on the protocols used. One known type of bus protocol is the non-split transaction protocol, such as is employed within a data processing apparatus having an AHB bus designed in accordance with the AHB bus protocol developed by ARM Limited, Cambridge, United Kingdom. In accordance with such a non-split transaction protocol, there is a fixed timing relationship between the address transfer of a transaction and the subsequent one or more data transfers of that transaction. In particular, the data transfer starts in the cycle following that in which the address is transferred. Within such a design, it is known to provide an address arbiter to arbitrate between multiple address transfers seeking to use a particular connection path. Due to the fixed timing relationship between the address transfers and data transfers, then it will be appreciated that the data transfers of multiple transactions occur in the same order as the arbitrated address transfers.

As interconnect logic increases in complexity, due to the need to support the interconnection of a larger number of master and slave logic units, then another type of bus protocol has been developed known as a split transaction protocol. In accordance with such a split transaction protocol, the plurality of connection paths within the interconnect logic provide at least one address channel for carrying address transfers and at least one data channel for carrying data transfers. An example of such a split transaction protocol is the AXI (Advanced eXtensible Interface) protocol developed by ARM Limited, Cambridge, United Kingdom. The AXI protocol provides a number of channels over which information and data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to the master logic unit at the end of a write transaction, such transaction status information indicating for example whether the transaction completed successfully, or whether an error occurred, etc. Use of such a split transaction protocol can increase the performance of a system compared with a similar system using a non-split transaction protocol. It should be noted that whichever protocol is used, the sending of the address initiates the transaction, and the completion of the data transfer completes it.

It should be noted that embodiments of the present invention cover both such transactions and relate to transactions that are controlled by an address even if the address is sent along a different route. The connection between the initiator and the recipient remaining open for the transaction and being closed at the end of it.

Figure 2:
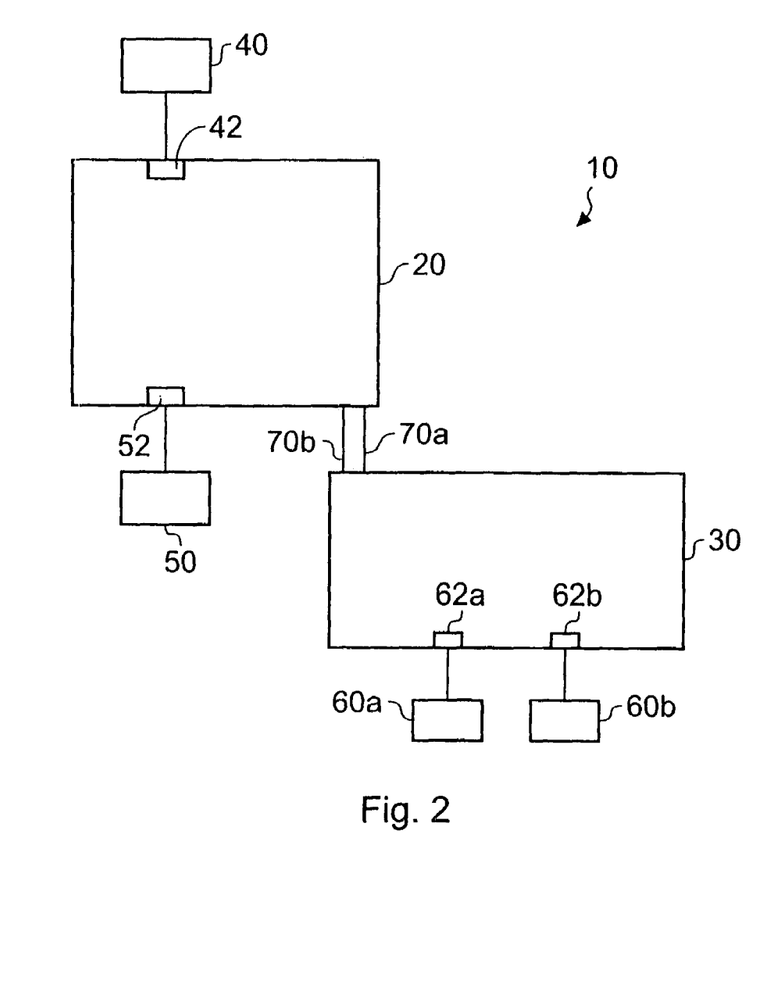
FIG. 2 schematically illustrates a simple interconnect block according to an embodiment of the present invention.

FIG. 2 schematically illustrates an interconnect block 10 according to an embodiment of the present invention. Interconnect block 10 comprises two portions a first portion 20 and a second portion 30. These portions are connected by two possible data routes 70a and 70b. First portion 20 has in this embodiment one master 40 connected to master port 42 and it has a slave 50 connected to slave port 52. There are two further slave devices 60a and 60b connected to ports 62a and 62b respectively on the second portion 30 of the interconnect block. Thus, master 40 wishing to access either of slave 60a or 60b must have a connection formed via one of the connecting data routes 70a or 70b. It should be noted, that this embodiment is a simple embodiment with only one master. Two connecting routes may seem on the face of it to be excessive for routes to be formed from a single master, however it may be that master 40 sends a transaction request to access slave 60a and then a transaction request to access slave 60b before the transaction to slave 60a has completed. The provision of two possible connecting routes in such a circumstance allows the two transactions to be processed in parallel rather than one having to wait for the other to finish.

With regard to this figure, it should be noted that only two portions of interconnect block 10 are shown for simplicity, however it would be possible to have further portions with further connecting routes between them. Furthermore, clearly the number of masters and slave attached to each portion can change as can the number of connecting routes 70 between the portions. It has been found that providing two connecting routes between the two portions increases the performance of the interconnect block 10 by a large amount without increasing area by very much. Further increases in the number of interconnecting routes improve performance to a lesser degree with a higher hit on area. This is of course dependent to some extent on the embodiment and there are embodiments where further connecting routes are advantageous.

Figure 3:
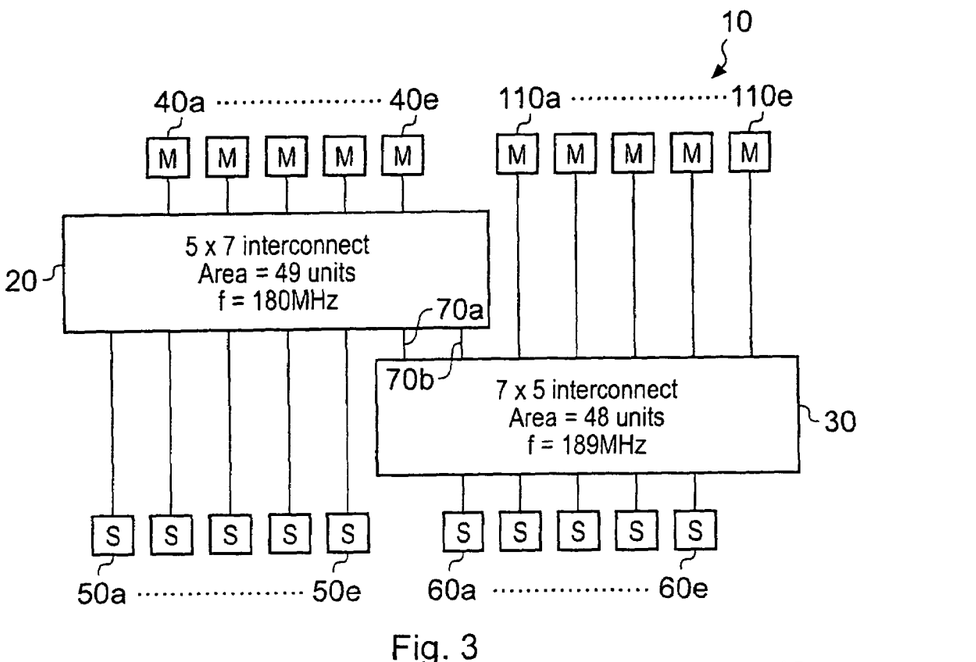
FIG. 3 schematically illustrates a further example of an interconnect block according to an embodiment of the present invention.

FIG. 3 shows an interconnect block 10 according to a further embodiment of the present invention. Interconnect block 10 comprises a first portion 20 and a second portion 30. First portion 20 has five masters 40a to 40e connected to it and five slaves 50a to 50e connected to it. It is also connected to the second portion 30 via two connecting routes 70a and 70b. Portion 30 has five masters of its own 110a to 110e connected to it and five slaves 60a to 60e connected to it. Any of masters 40a to 40e wishing to connect to any of slaves 60a to 60e must do so via one of the connecting routes 70a, 70b. In this embodiment, none of masters 110a to 110e can connect to any of slaves 50a to 50e. This is generally fine as there may be many systems where certain masters and slaves will never need to access each other. It should be noted that although it may be set up so that any of the masters connecting to the first portion can communicate with any of the slaves on the second portion, it may also be arranged such that some recipients on a particular portion do not have possible data routes to the connecting routes 70a or 70b but only have possible routes to the masters on their own portion. In some arrangements it is clear that some masters and slaves will never need to access each other, if this is known the device can be arranged such that connections that will never be needed are not provided this will produce a circuit area saving.

Figure 4:
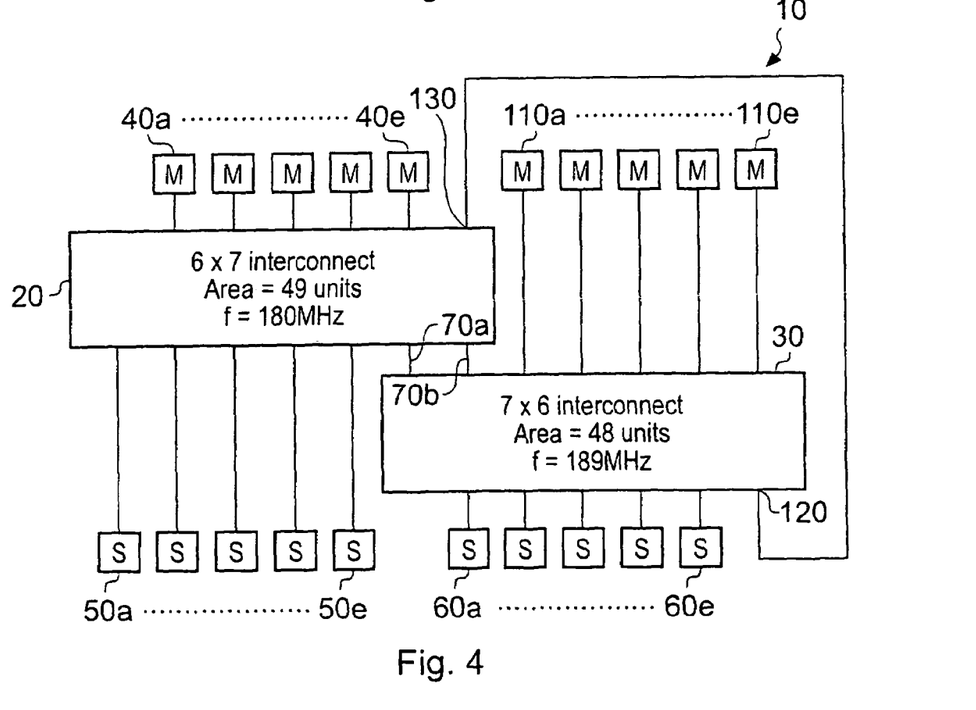
FIG. 4 schematically illustrates the interconnect block of FIG. 3 with improved connectivity.

FIG. 4 shows an alternative embodiment to FIG. 3 with an additional port 120 on the second portion 30. This additional port 120 is connected to an additional port 130 on the first portion 20. This connection between the additional ports enables any of masters 110a to 110e to connect to any of slaves 50a to 50e.

Figure 5A:
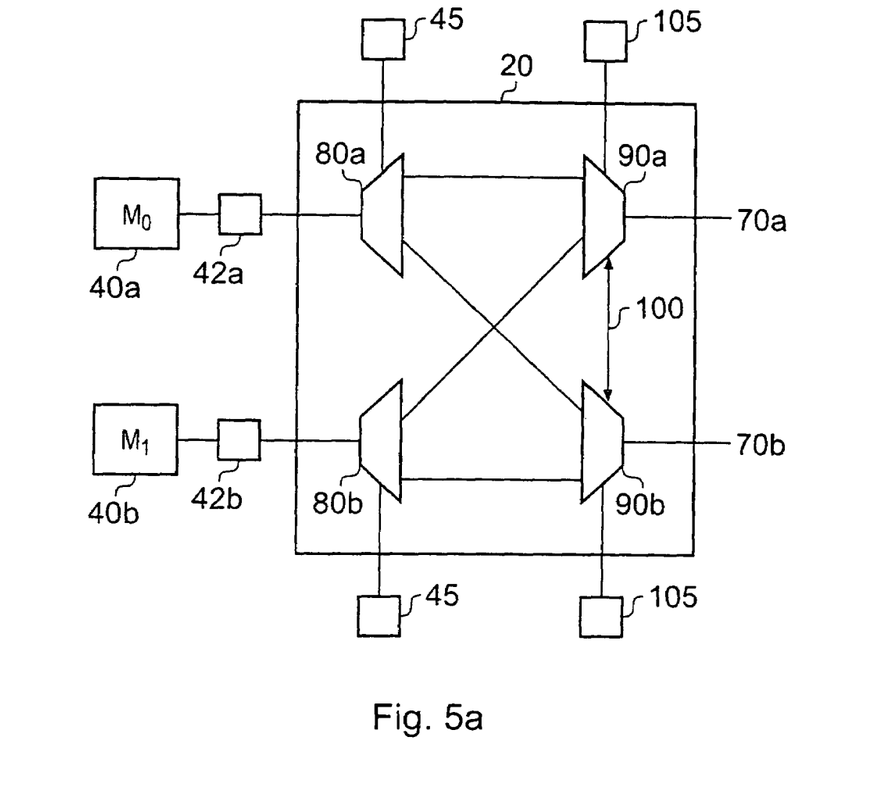
FIGS. 5a to 5e schematically illustrate connections formed across the portions of the interconnect block in response to a transaction according to an embodiment of the present invention.
Figure 5B:
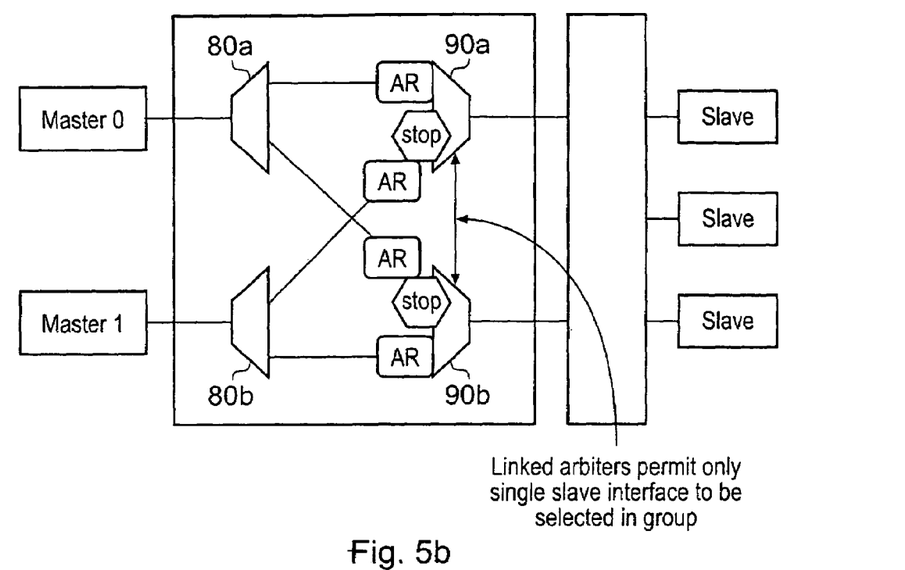

FIG. 5a shows in schematic form a simplified form of the first portion 20 of the interconnect block 10 of FIG. 3, showing two masters 40a and 40b and possible connections that they can form between the masters 40a and 40b and the connecting data routes 70a and 70b. These possible connections include routers 80a and 80b associated with the two master ports 42a and 42b which in this embodiment are multiplexers. These routers are controlled by an address decoder 45. In response to an address received at the address decoder 45 the routers open up suitable routes across the first portion. If the address decoder indicates that a slave on the second portion of the interconnect is to be accessed, then they open up routes to the portion connecting routes 70a and 70b. In this embodiment the portion connecting routes 70a and 70b are equivalent, routers 80a and 80b are aware of this and thus, open up routes 47a and 47b and 48a and 48b respectively to both of these connecting routes. It would be clear to a skilled person that if further connecting routes were present then all routes to all connecting routes would be opened by the routers. The connecting routes have their own routers 90a and 90b associated with them, which are also multiplexers and these are linked to each other. These receive the request for a connecting route from say router 80a and one of them accepts this request, this information is sent to the other(s) router(s) via the arbiter link 100 between the routers and this causes the other router(s) to refuse the link. This arbiter link is controlled by arbiter 105, which comprises arbitration logic operable to decide which route to select based on certain-criteria FIG. 5b shows this process, with router 90b accepting the link from router 80b and therefore router 90a refuses this link. A request is also received from router 80a, as router 90b has accepted the request from router 80b it refuses 80a and thus this route is closed. Router 90a then accepts this request and closes the route from router 80b.

The request that router 90a or 90b accepts can be decided by a number of factors determined by arbitration logic that controls the routers via arbiter 105. These can be a priority factor, one route being set as a priority route and accepting requests from transactions that are marked as priority transactions. Alternatively it can be done so that one router always accepts requests from one master port in preference to the other master port(s), or it can be done in a round robin way, so that if one router accepted a request from say master 40a last time it will accept a request from master 40b next time. It should be noted that although a single arbiter is shown, each connecting router may have its own arbiter. It is important however that the routers are linked, so that if there are multiple arbiters each knows what the other is doing. It should also be noted that the path from the masters to the arbiters is registered before the multiplexer selects an output value from the arbiter, so that no combinatorial path is introduced between the masters and arbiters.

Figure 5C:
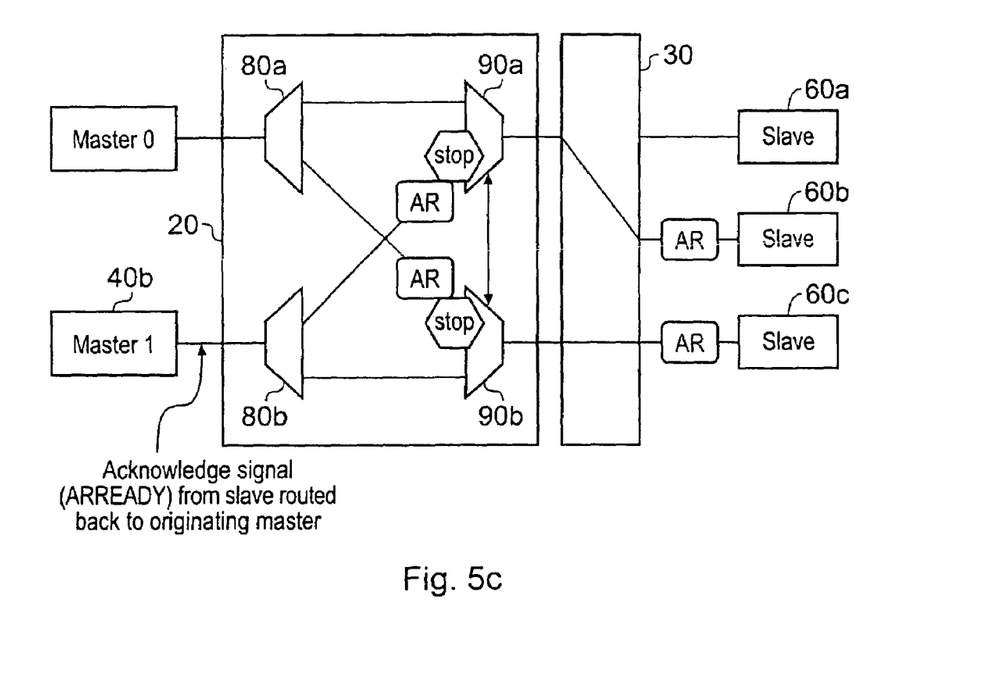
Figure 5D:
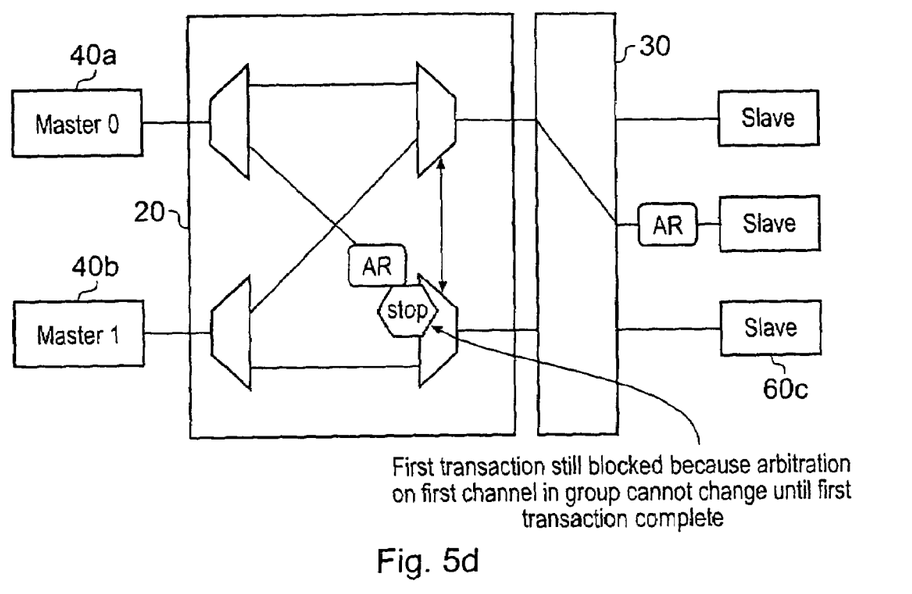
Figure 5E:
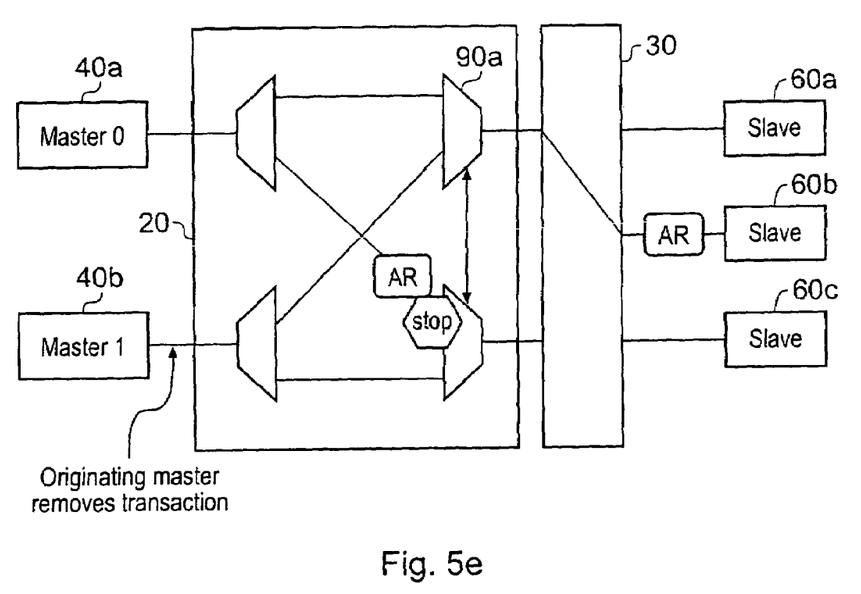

FIG. 5c shows the second portion 30 as well as first portion 20 and indicates a route right through to the appropriate slave. When a transaction has finished a signal is sent back from the slave, in this case slave 60c to the master 40b and the master 40a then removes the transaction (see FIG. 5e) and clears routes to both routers 90a and 90b see FIG. 5d. The transaction between master 40b and slave 60b has not completed yet and thus, this route is maintained. The other route from master 40a to router 90b is also still blocked as the transaction from master 40a has not finished It should be noted that it may be that for some transactions routers 90a and 90b will both accept the request and will allow both routes between a router and the two routers to remain open. In this case, as they are equivalent routes some of the data can be sent down one of the routes and the rest of the data down a different one. This can have disadvantages in that sometimes the data can get out of order which can cause errors.

Figure 6:
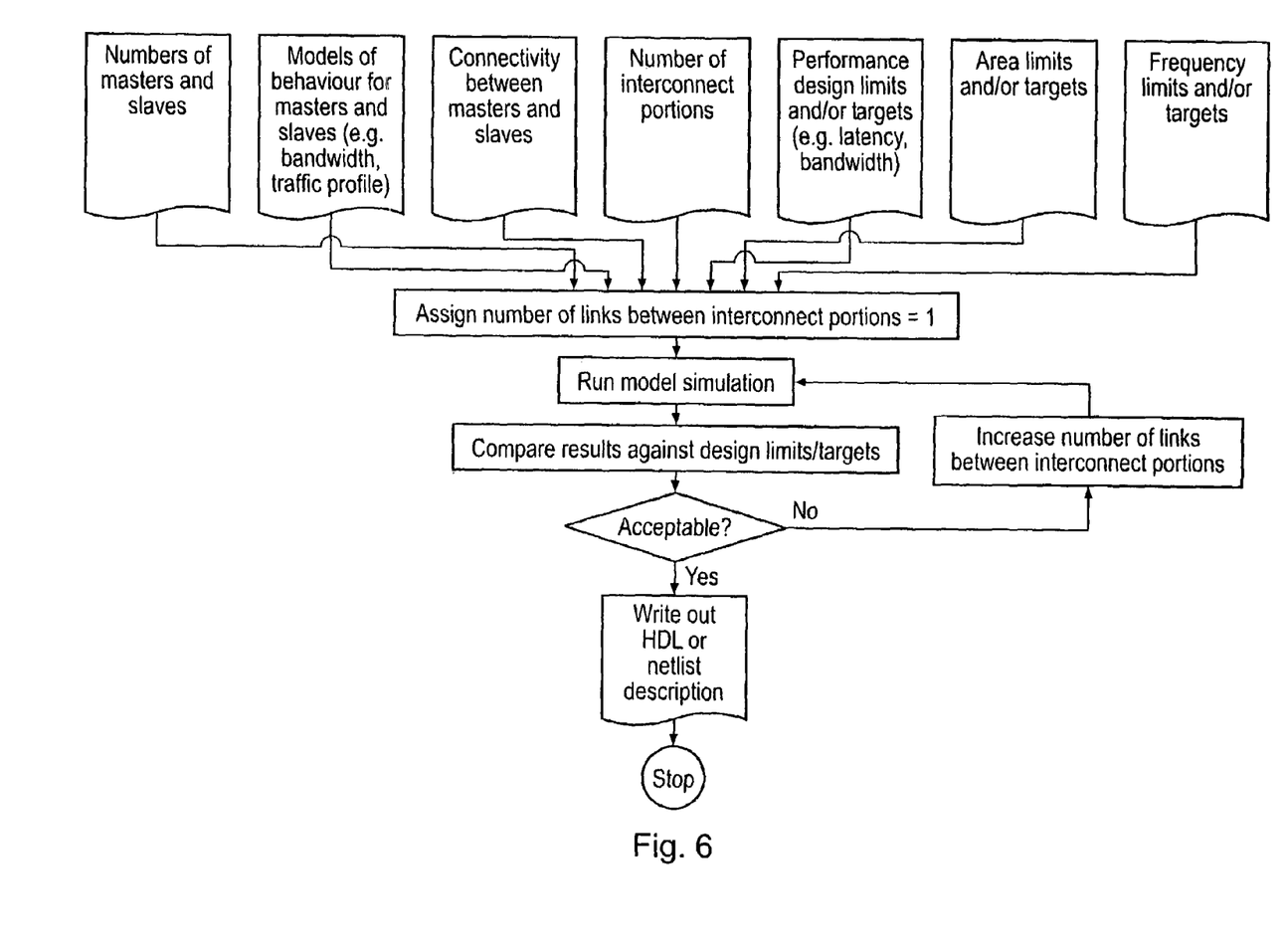
FIG. 6 shows a method of configuring an interconnect block according to an embodiment of the present invention.

FIG. 6. shows a flow diagram illustrating a method of configuring an interconnect block according to an embodiment of the present invention. This is often a GUI based configuration tool and is generally be run as software on a computer.

In this configuration program, a user will be requested to enter certain things.

These may include all or some of the following: the number of masters and slaves required for the interconnect block, models of the behaviour of the masters and slaves for example their bandwidth, traffic profile and so on and also possibly a desired connectivity between the masters and slaves, i.e. which master needs to communicate with which slaves. The number of portions of the interconnect could also be entered in some embodiments along with performance design targets or limits such as latency and bandwidth. Other limits such as limits on the area or targets on the area could also be entered along with frequency limits and/or targets.

Some or all of these data is entered by a user and the program will then assign a first number of links between the portions of the interconnect. It can then run a model simulation of the interconnect device and will determine the properties of such a device. These could be compared against the design limits or targets and a decision can be made as to whether they are acceptable or not. If they are not acceptable then the number of links between the interconnect portions can be increased and the model simulation can be run again.

When an acceptable interconnect has been configured in this way, the HDL, verilog or the net list description of the interconnect can then be output. In this way, an interconnect can be designed with an appropriate number of links between the portions so as to produce the desired properties of the interconnect device.

In some embodiments in addition to changing the number of connecting links, other properties can be changed, such as the number of slaves and masters connected to each block.

In other embodiments the number of connecting links can be input by a user. In such an embodiment the step of assigning a number of links between the interconnect portions is performed in response to the user's input and is not altered during the design.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interconnect block for a data processing apparatus, said interconnect block providing data routes via which at least one initiator device may access at least three recipient devices, said interconnect block comprising:

a first and a second portion;

said first portion comprising at least one initiator port for communicating with one of said at least one initiator device and at least one recipient port for communicating with one of at least three recipient devices;

said second portion comprising at least two recipient ports for communicating with at least two of said at least three recipient devices, said second portion being connected to said first portion via at least two parallel connecting routes, said at least two recipient ports being connectable to said at least two parallel connecting routes;

wherein, said first portion comprises:

at least two connecting routers associated with said respective at least two parallel connecting routes, and at least one initiator port router associated with said initiator port, said at least one initiator port router configured to perform a transaction in response to a request received from one of said initiator devices at said first portion, said transaction accessing one of said at least three recipient devices and said initiator port router, in response to an address associated with said request, is configured to;

provide data routes from said at least one initiator port router to said at least one recipient in response to an address associated with said request indicating said at least one recipient, and provide data routes from said at least one initiator port router to all of said at least two connecting routers in response to said address indicating one of said at least two recipients communicating with said second portion, and to maintain at least one of said data routes for the duration of said transaction.

2. An interconnect block according to claim 1, wherein said interconnect block is configured to provide said data route via one of said at least two parallel connecting routes, said one of said at least two parallel connecting routes being selected in dependence upon a predetermined criterion.

3. An interconnect block according to claim 1, wherein said at least two parallel connecting routes are equivalent to each other.

4. An interconnect block according to claim 3, wherein said interconnect block is operable to provide said data route via at least two of said at least two parallel connecting routes, one part of said transaction travelling along one of said connecting routes and a further part of said transaction travelling along a different one of said connecting routes.

5. An interconnect block according to claim 1, said interconnect block further comprising at least two connecting routers associated with said respective at least two parallel connecting routes and an arbiter, said arbiter configured to control said at least two connecting routers to select one of said at least two connecting routes for a particular transaction in response to a predetermined criterion.

6. An interconnect block according to claim 5, wherein said arbiter is configured to control said at least two connecting routers, such that said data routes from said initiator port router to said at least two connecting routers associated with said parallel connecting route not selected are closed and a data route to said connecting router associated with said selected connecting route is maintained.

7. An interconnect block according to claim 5, wherein said predetermined criterion comprises an availability of said connecting routes.

8. An interconnect block according to claim 1, wherein said second portion further comprises at least one initiator port for communicating with at least one further initiator device, said second portion configured to provide a data route between said at least one initiator port and said at least two recipient ports, such that said at least one further initiator device may access either of said at least two recipient devices.

9. An interconnect block according to claim 8, said second portion further comprising a further recipient port and said first portion comprising a further initiator port, said further recipient port and said further initiator port being connected to each other such that said interconnect block provides a data route between said at least one further initiator device in communication with said second portion and said at least one recipient device in communication with said first portion.

10. An interconnect block according to claim 1, wherein said first portion comprises at least two initiator ports configured to communicate with at least two initiator devices and wherein said first portion, in response to two requests from two initiator devices, is configured to access two of said at least two recipients received in a same clock cycle from two of said initiator devices, to provide two data routes between said initiator devices and said recipient devices via two of said at least two parallel connecting routes.

11. An interconnect block according to claim 1, comprising two parallel connecting routes.

* * * * *